Feb. 29, 1944.  F. E. SANDELL  2,342,900

INTERNAL COMBUSTION ENGINE

Filed Jan. 8, 1942

INVENTOR.
FOLKE E. SANDELL
BY
ATTORNEY.

Patented Feb. 29, 1944

2,342,900

UNITED STATES PATENT OFFICE 2,342,900

INTERNAL COMBUSTION ENGINE

Folke E. Sandell, Detroit, Mich.

Application January 8, 1942, Serial No. 426,014

21 Claims. (Cl. 123—53)

My invention relates to a new and useful improvement in an internal combustion engine and particularly an engine of the two-cycle type in which a pair of cylinders are arranged for using a common combustion chamber. In this type of engine experience has shown that efficient scavenging and a high degree of supercharging is difficult to obtain.

It is an object of the present invention to provide a construction by which the cylinders may be scavenged and supercharged in a more efficient manner than heretofore.

Another object of the invention is the provision of a construction of this type whereby the cylinders can be supercharged after the piston controlled inlet and exhaust ports have been closed.

Another object of the invention is to provide a construction whereby the length of the period of supercharging can be made independent of the piston controlled inlet and exhaust ports.

Another object of the invention is the provision of a structure whereby the delivery of the supercharging fluid into the cylinders may be timed and delivery effected independent of the piston controlled inlet and exhaust ports.

Another object of the invention is the provision of a structure whereby the ceasing of the delivery of the supercharging fluid may be timed independently of the piston controlled inlet and exhaust ports.

Another object of the invention is the provision of a structure whereby the cylinders may be supercharged by a fluid under pressure equal to, greater than or less than the pressure of the fluid delivered through the piston controlled inlet ports.

Another object of the invention is to provide a means by which the supercharging fluid may be introduced through the hot piston controlled inlet ports.

Another object of the invention is the provision of a structure so arranged that the volumetric efficiency of the engine may be increased.

Another object of the invention is the provision in an engine of this type, of a supercharging mechanism so arranged and constructed that the fluid may serve to wash and cool the cylinder walls and piston heads of the engine.

Another object of the invention is the provision of a structure in which an increased turbulance within the cylinders is created, thus effecting a more intimate mixture with a resultant more efficient combustion.

Another object of the invention is the provision of a structure whereby an extremely high degree of supercharging may be accomplished so as to increase the brake mean effective pressure and thereby obtain greater power output of the engine at extremely high altitudes.

Another object of the invention is the provision of a structure whereby the flow of supercharging fluid into the cylinders may be increased to maximum volume, thus enabling the engine crank shaft or crank shafts to revolve faster and thus increase the power output of the engine.

Another object of the invention is the provision of a structure whereby the kinetic energy of the fluid flowing may be utilized for delivering an additional amount of fluid into the cylinders.

Another object of the invention is the provision of a structure whereby the supercharging fluid may be directed to impinge upon the hotter elements of the combustion chamber.

Another object of the invention is the provision of a construction whereby the scavenging fluid through the piston controlled inlet ports may be utilized for cooling the inlet cylinder and piston and supercharging fluid utilized to cool the exhaust cylinder and piston, and whereby the supercharging fluid combining with the scavenging fluid through the piston controlled inlet port may be utilized for lowering the average temperature within the engine.

Another object of the invention is the provision of a construction whereby the piston controlled exhaust ports may be timed to open at a low position of movement of the piston, thus increasing the brake mean effective pressure of the engine.

Another object of the invention is the provision of an engine having time controlled supercharging valve or valves with piston controlled inlet and exhaust ports so arranged and constructed as to provide a compact, light, durable, ecnomical and highly efficient engine. Other objects will appear hereinafter.

It is recognized that various changes and modifications may be made in the detail of structure illustrated without departing from the spirit of the invention and it is intended that such shall be incompassed within the scope of the claims forming a part hereof.

Forming a part of the specification is a drawing in which.

Figure 1:
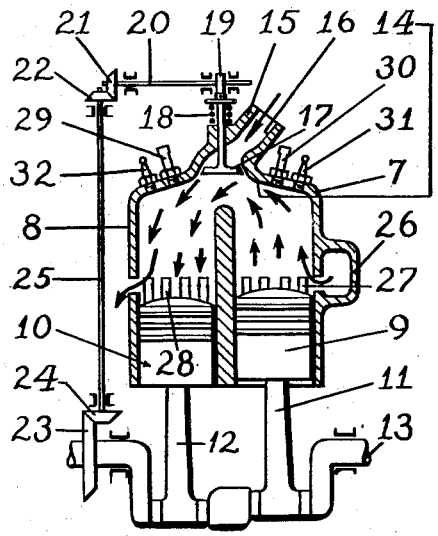
Fig. 1 is a fragmentary, sectional view of an engine embodying the invention.

In Fig. 1 I have illustrated a cross section of a two-cycle engine involving the invention and provided with a pair of cylinders 7 and 8 reciprocating in which are the pistons 9 and 10 respectively, these pistons being connected by the connecting rods 11 and 12 respectively to the cranks of a crank shaft 13. The cylinders 7 and 8 are in communication with each other through the common combustion chamber 14 provided with a nipple 15 which may be attached to a suitable source of air, fuel or other suitable fluid under pressure. The nipple 15 may be said to have an inlet passage 16 communicating with the common combustion chamber 14 and closed at its inlet end by means of the valve 17 normally held in closed position by the spring 18 and moved to open position by the rotating cam 19 mounted on the shaft 20 driven through the gearing 21, 22, 23 and 24 and the shaft 25 in timed relation to the rotation of the crank shaft 13.

An inlet manifold 26 serves to communicate with the cylinder 7 through the inlet ports 27. These inlet ports are opened and closed upon the sliding of the piston 9 in the cylinder 7, the piston serving as a control valve for the inlet ports. Other ports 28 are formed in the cylinder 8 which are controlled by the piston 10. Fuel injectors 29 and 30 communicate with the cylinders 8 and 7 respectively and mounted on the combustion chamber 14 are the spark plugs 31 and 32.

In operation when the piston 9 has moved downwardly to uncover the inlet ports 27 the piston 10 will have moved downwardly to have previously uncovered the exhaust ports 28 so that fluid delivered through the inlet ports 27 from the manifold 26 will rush in and serve to effect scavenging. This incoming fluid will also serve to cool the walls of the cylinder 7 and the walls of the combustion chamber 14. It is believed obvious that the pistons 9 and 10 travel substantially in unison with each other in the same direction. By proper timing of the cam mechanism for opening the valve 17 the valve 17 may be opened so that fluid delivered through the passage 16 under pressure may be utilized for assisting in the scavenging, this valve 17 being opened while the exhaust ports 28 are uncovered by the piston 10. It will be noted, as shown in Fig. 1, that the passage 16 is so inclined that the fluid entering from this passage will be directed against the walls and hot parts of the exhaust cylinder end of the combustion chamber so as to effect a cooling of these parts. It is believed obvious that the length of time during which the valve 17 is held off its seat may be regulated by the shape of the cam 19. It is also believed obvious that the opening and closing of the valve 17 may be effected independently of the positions of the pistons 9 and 10 in their cylinders. Since the supercharging fluid entering through the passage 16 is used to assist the fluid entering through the inlet ports 27 in scavenging the cylinders, it is believed obvious that the scavenging will be accomplished in a shorter time, thus permitting the location of the cylinder ports at a position lower than would be possible were not the additional fluid used for scavenging and supercharging purposes. This makes it possible to lengthen the power stroke of the engine. It is also believed obvious that the length of time required for this scavenging may be reduced because of the use of the additional scavenging fluid, thus making it possible for a more rapid rotation of the crank shaft or crank shafts and thus effecting an increase in power output of the engine.

Experience has shown that by supercharging in this manner the kinetic energy of the fluid entering through the passage 16 may be utilized for dragging or cramming the supercharging fluid into the cylinders, thus increasing the volume of fluid which is admitted into the combustion chamber and cylinders.

It is believed obvious that the supercharging fluid could be delivered in a cooler state through the passage 16 than through the piston controlled ports with the consequent advantages resulting therefrom which have been previously referred to. It is believed obvious that the fluid delivered through the passage 16 may be regulated to any desired pressure so as to be equal to, greater than or less than the pressure of the fluid delivered from the manifold 26. It is also obvious that if the fluid delivered through the passage 16 is at a temperature lower than could be delivered through the piston controlled inlet ports, a power advantage is obtained when the combustion is effected.

While I have illustarted spark plugs, it is obvious that if the engine is of the type where compression ignition is resorted to, the spark plugs may be eliminated.

While I have illustrated only 1 pair of cylinders in various arrangements, all, embodying the invention, it is obvious that an engine structure can be arranged that will employ several units of the disclosure.

In Fig. 1 I have illustrated the cylinders 7 and 8 as extending parallel to each other.

Figure 2:
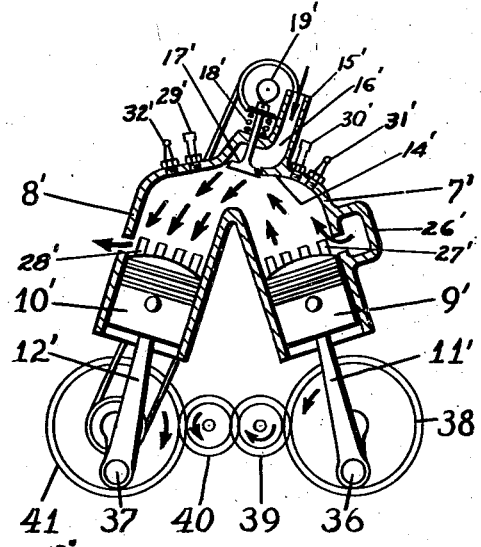
Fig. 2 is a fragmentary, sectional view of an engine embodying the invention, illustrating a slightly modified form.

In Fig. 2 a slightly different structure is set forth in which the cylinders 7' and 8' correspond to the cylinders 7 and 8 of Fig. 1. It will be noted that these cylinders are so positioned relatively to each other that their longitudinal axes are inclined to each other at an acute angle. The other parts illustrated in Fig. 1 are also shown in Fig. 2 and are indicated by the same reference numerals, the numerals in Fig. 2 being primed. The pistons 9' and 10' are connected by the connecting rods 11' and 12' to the crank shafts 36 and 37 respectively, a pair of crank shafts being utilized. On the crank shaft 36 is a gear 38 meshing with a gear 39 which in turn meshes with a gear 40 meshing with the gear 41 mounted on the crank shaft 37. The valve operation and the timing mechanism is similar to that shown in Fig. 1.

Figure 3:
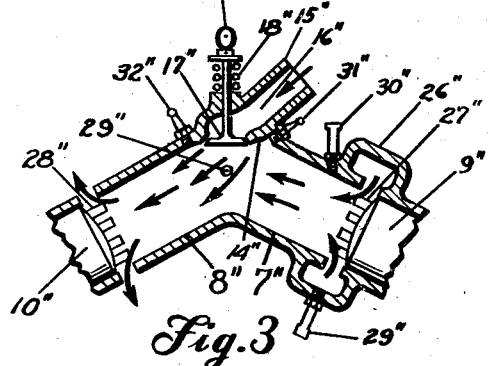
Fig. 3 is a fragmentary, sectional view of the invention showing a further modification.

In Fig. 3 I have indicated a further modified form of the invention in which the cylinders 7" and 8" correspond to the cylinders 7 and 8 shown in Fig. 1. The cylinders 7" and 8" are inclined toward each other at an obtuse angle. The remaining parts shown in Fig. 1 are present in Fig. 3 and bear similar reference numerals, the numerals being double primed, excepting that the combustion chamber 14 is not present as a distinct structure as shown in Fig. 1, but forms a blending of the interior of the two cylinders 7" and 8". It will be noted that the injector 30"

of Fig. 3 has been positioned at a point away from the combustion chamber. The location of the injector 29" has also been changed. This is to indicate that the fuel injectors may be located in the cylinder walls or in the inlet manifold or in any other desired position and that they need not discharge directly into the combustion chamber.

Figure 4:
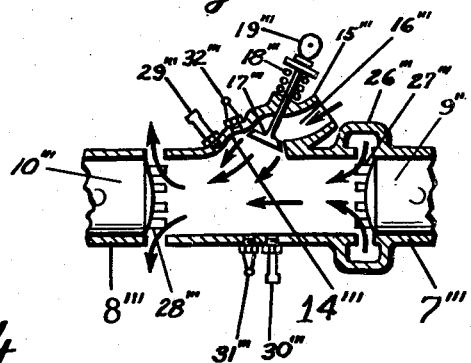
Fig. 4 is a fragmentary sectional view of an engine showing a still further modification of the invention.

In Fig. 4 I have indicated the cylinders 7''' and 8''' which correspond to the cylinders 7 and 8 in Fig. 1, the cylinders 7''' and 8''' in Fig. 4 being positioned so that they are in longitudinal alignment with each other. The various parts shown in Fig. 1 are present in the structure shown in Fig. 4 and bear the same reference numerals, these numerals being triple primed. In the various modifications all of the advantages and functions of the form shown in Fig. 1 are present and they are obtained.

What I clam as new is:

1. In a two-stroke, internal combustion engine, a pair of cylinders; a piston slidably mounted in each of said cylinders; a common combustion chamber, comprising in part a cylinder head, communicating with said cylinders, one of said cylinders having inlet ports overrun by its piston and the other of said cylinders having exhaust ports overrun by its piston; means for connecting said pistons together for reciprocating substantially in unison with each other; said combustion chamber having an inlet port in the head; means for conducting fluid under pressure through the inlet port to said combustion chamber; a valve mechanism for controlling the inlet port in said combustion chamber; and means for operating said valve mechanism in timing with the reciprocation of said pistons.

2. In a two-stroke, internal combustion engine, a pair of cylinders having parallel axes; a piston slidably mounted in each of said cylinders; means for connecting said pistons together for reciprocating substantially in unison; a common combustion chamber, comprising in part a cylinder head, communicating with said cylinders, one of said cylinders having inlet ports overrun by the piston therein and the other of said cylinders having exhaust ports overrun by the piston therein; said combustion chamber having an inlet port formed in said head therein; a control valve for controlling the inlet port in said combustion chamber; and means for conducting fluid under pressure through the inlet port in the said combustion chamber.

3. In a two-stroke, internal combustion engine, a pair of cylinders disposed with their longitudinal axes angularly to each other; a common combustion chamber, defined in substantial part by a cylinder head communicating with said cylinders; a piston slidably mounted in each of said cylinders; means connecting said pistons together for reciprocation substantially in unison with each other; one of said cylinders having inlet ports overrun by the piston therein and the other of said cylinders having exhaust ports overrun by the piston therein; said combustion chamber having an inlet port in the head for admission of fluid under pressure; a valve for controlling the inlet port in said combustion chamber; and means for operating said valve in timed relation to the reciprocation of said pistons.

4. In a two-stroke, internal combustion engine, a pair of cylinders disposed with their longitudinal axes in alignment; a common combustion chamber, defined in substantial part by a fixed cylinder head communicating with said cylinders; a piston slidably mounted in each of said cylinders; means connecting said pistons for reciprocation substantially in unison with each other; one of said cylinders having inlet ports overrun by the piston therein and the other of said cylinders having exhaust ports overrun by the piston therein; said combustion chamber having an inlet port for admission of fluid under pressure; a valve for controlling the inlet port in said combustion chamber; and means for operating said valve in timed relation to the reciprocation of said pistons.

5. In a two-stroke, internal combustion engine, a pair of cylinders; a piston slidably mounted in each of said cylinders; a common combustion chamber, defined in part by a fixed cylinder head communicating with said cylinders; one of said cylinders having inlet ports overrun by its piston and the other of said cylinders having exhaust ports overrun by its piston; means for connecting said pistons together for reciprocating substantially in unison with each other; said combustion chamber having an inlet port; means for conducting fluid under pressure through the inlet port to said combustion chamber; and means for delivering fuel to said combustion chamber.

6. In a two-stroke, internal combustion engine, a pair of cylinders; a piston slidably mounted in each of said cylinders; a common combustion chamber, defined in part by a cylinder head communicating with said cylinders; one of said cylinders having inlet ports overrun by its piston and the other of said cylinders having exhaust ports overrun by its piston; means for connecting said pistons together for reciprocating substantially in unison with each other; said combustion chamber having an inlet port; means for conducting fluid under pressure through the inlet port to said combustion chamber; ignition means in said combustion chamber; a valve mechanism for controlling the inlet port in said combustion chamber; and means for operating said valve mechanism in timing with the reciprocation of said pistons.

7. In a two-stroke, internal combustion engine, a pair of cylinders; a piston slidably mounted in each of said cylinders; a common combustion chamber, defined in part by a fixed cylinder head communicating with said cylinders; one of said cylinders having inlet ports overrun by its piston and the other of said cylinders having exhaust ports overrun by its piston; means for connecting said pistons together for reciprocaitng substantially in unison with each other; said combustion chamber having an inlet port; means for conducting fluid under pressure through the inlet port to said combustion chamber; ignition means in said combustion chamber; and means for delivering fuel to said combustion chamber.

8. In a two-stroke, internal combustion engine, a pair of cylinders; a piston slidably mounted in each of said cylinders; a common combustion chamber, defined in part by a fixed head communicating with said cylinders; one of said cylinders having inlet ports overrun by its piston and the other of said cylinders having exhaust ports overrun by its piston; means for connecting said pistons together for reciprocating substantially in unison with each other; said combustion chamber having an inlet port; means for conducting fluid under pressure through the inlet port to said combustion chamber; means for delivering fuel to the combustion chamber; ignition means in said combustion chamber; a valve mechanism for controlling the inlet port in said combustion chamber; and means for operating said valve mechanism in timing with the reciprocation of said pistons.

9. In a two-stroke, internal combustion engine, a pair of cylinders; a piston slidably mounted in each of said cylinders; a common combustion chamber communicating with said cylinders; one of said cylinders having inlet ports overrun by its piston and the other of said cylinders having exhaust ports overrun by its piston; means for connecting said pistons together for reciprocating substantially in unison with each other; said combustion chamber having an inlet port; means for conducting fluid under pressure through the inlet port to said combustion chamber; a conduit means connected to said inlet port for delivering fluid under pressure into said combustion chamber and directing said fluid against the walls of the cylinders having said exhaust openings formed therein.

10. In a two-stroke, internal combustion engine of the class described, a pair of cylinders; a common combustion chamber connecting said cylinders together; a piston slidably mounted in each said cylinders; means for connecting said pistons together for reciprocation in substantial unison with each other; one of said cylinders having inlet ports overrun by the piston therein and the other of said cylinders having exhaust ports overrun by the piston therein; means for delivering fluid into the cylinder through said inlet ports; said combustion chamber having an inlet port; a conduit for delivering fluid into said combustion chamber through said inlet port and directing said fluid against the walls of the cylinder having said exhaust openings formed therein.

11. In a two-stroke, internal combustion engine of the class described, a pair of cylinders; a common combustion chamber connecting said cylinders together; a piston slidably mounted in each of said cylinders; means for connecting said pistons together for reciprocation in substantial unison with each other; one of said cylinders having inlet ports overrun by the piston therein and the other of said cylinders having exhaust ports overrun by the piston therein; means for delivering fluid into the cylinder through said inlet ports; a conduit for delivering fluid into said combustion chamber and directing said fluid against the walls of the cylinder having said exhaust openings formed therein; means for controlling the delivery of fluid through said conduit into said combustion chamber; and means for operating said control means in timed relation to the reciprocation of said pistons.

12. In a two-stroke, internal combustion engine of the class described, a pair of cylinders; a common combustion chamber connecting said cylinders together; a piston slidably mounted in each of said cylinders; means for connecting said pistons together for reciprocation in substantial unison with each other; one of said cylinders having inlet ports overrun by the piston therein and the other of said cylinders having exhaust ports overrun by the piston therein; means for delivering fluid into the cylinder through said inlet ports; a conduit for delivering fluid into said combustion chamber and directing said fluid against the walls of the cylinder having said exhaust openings formed therein; means for controlling the delivery of fluid through said conduit into said combustion chamber; ignition means in said combustion chamber; means for operating said control means in timed relation to the reciprocation of said pistons; and means for delivering fuel into said combustion chamber.

13. In a two-stroke, internal combustion engine, a pair of cylinders; a piston slidably mounted in each of said cylinders; a common combustion chamber, defined in part by a cylinder head, communicating with said cylinders; one of said cylinders having inlet ports overrun by its piston and the other of said cylinders having exhaust ports overrun by its piston; said exhaust ports being uncovered prior to the uncovering of said inlet ports upon movement of said pistons in one direction and said exhaust ports being covered prior to the covering of said inlet ports upon movement of said pistons in the opposite direction; means for connecting said pistons together for reciprocating substantially in unison with each other; said combustion chamber having an inlet port; and means for conducting fluid under pressure through said inlet port to said combustion chamber.

14. In a two-stroke, internal combustion engine, a pair of cylinders; a piston slidably mounted in each of said cylinders; a common combustion chamber, defined in part by a cylinder head, communicating with said cylinders; one of said cylinders having inlet ports overrun by its piston and the other of said cylinders having exhaust ports overrun by its piston; means for connecting said pistons together for reciprocating substantially in unison with each other, said combustion chamber having an inlet port; ignition means in said combustion chamber; means for conducting fluid under pressure through the inlet port to said combustion chamber; and means for delivering fuel into said cylinders.

15. In a two-stroke, internal combustion engine, a pair of cylinders; a piston slidably mounted in each of said cylinders; a common combustion chamber, defined in part by a fixed head, communicating with said cylinders, one of said cylinders having inlet ports overrun by its piston and the other of said cylinders having exhaust ports overrun by its piston; means for connecting said pistons together for reciprocating substantially in unison with each other, said combustion chamber having an inlet port; ignition means in said combustion chamber; means for conducting fluid under pressure through the inlet port to said combustion chamber; and means for delivering fuel to said cylinder having inlet ports formed therein.

16. In a two-stroke, internal combustion engine, a pair of cylinders; a piston slidably mounted in each of said cylinders; a common combustion chamber, consisting in part of a cylinder head, communicating with said cylinders, one of said cylinders having inlet ports overrun by its piston and the other of said cylinders having exhaust ports overrun by its piston; means for connecting said pistons together for reciprocating substantially in unison with each other, said combustion chamber having an inlet port; means for conducting fluid under pressure through the inlet port to said combustion chamber; ignition means in said combustion chamber; and means for delivering fuel to said cylinder having exhaust ports formed therein.

17. In a two-stroke, internal combustion engine, a pair of cylinders; a piston slidably mounted in each of said cylinders; a common combustion chamber communicating with said cylinders; one of said cylinders having inlet ports overrun by its piston and the other of said cylinders having exhaust ports overrun by its piston; means for connecting said pistons together for reciprocating substantially in unison with each other, said combustion chamber having an inlet port; ignition means in said combustion chamber; means for conducting fluid under pressure through the inlet port to said combustion chamber; means for delivering fuel to said combustion chamber; and means for delivering fuel to said cylinder having exhaust ports formed therein.

18. In a two-stroke, internal combustion engine, a pair of cylinders; a piston slidably mounted in each of said cylinders; a common combustion chamber communicating with said cylinders, one of said cylinders having inlet ports overrun by its piston and the other of said cylinders having exhaust ports overrun by its piston; means for connecting said pistons together for reciprocating substantially in unison with each other, said combustion chamber having an inlet port; ignition means in said combustion chamber; means for conducting fluid under pressure through the inlet port to said combustion chamber; means for delivering fuel to said cylinder having exhaust ports formed therein; means for delivering fuel to said cylinder having inlet ports formed therein; and means for delivering fuel to said combustion chamber.

19. In a two-stroke, internal combustion engine, a pair of cylinders; a piston slidably mounted in each of said cylinders; a common combustion chamber communicating with said cylinders, one of said cylinders having inlet ports overrun by its piston and the other of said cylinders having exhaust ports overrun by its piston; means for connecting said pistons together for reciprocating substantially in unison with each other, said combustion chamber having an inlet port; ignition means in said combustion chamber; means for conducting fluid under pressure through the inlet port to said combustion chamber; a conduit for delivering fluid into said cylinder having inlet ports formed therein; means for delivering fuel into said conduit; and means for delivering fuel into said cylinder having inlet ports formed therein.

20. In a two-stroke, internal combustion engine, a pair of cylinders; a piston slidably mounted in each of said cylinders; a common combustion chamber communicating with said cylinders, one of said cylinders having inlet ports overrun by its piston and the other of said cylinders having exhaust ports overrun by its piston; means for connecting said pistons together for reciprocating substantially in unison with each other; ignition means in said combustion chamber, said combustion chamber having an inlet port; means for conducting fluid under pressure through the inlet port to said combustion chamber; a conduit for delivering fluid through said inlet ports in said cylinder having inlet ports formed therein; means for delivering fuel into said conduit; means for delivering fuel into said combustion chamber; and means for delivering fuel into said cylinder having inlet ports formed therein.

21. In a two-stroke, internal combustion engine, a pair of cylinders; a piston slidably mounted in each of said cylinders, a common combustion chamber communicating with said cylinders; one of said cylinders having inlet ports overrun by its piston and the other of said cylinders having exhaust ports overrun by its piston; means for connecting said pistons together for reciprocating substantially in unison with each other, said combustion chamber having an inlet port; means for conducting fluid under pressure through the inlet port to said combustion chamber; ignition means in said combustion chamber; a conduit for delivering fluid through said inlet ports in said cylinder having inlet ports formed therein; and means for delivering fuel into said conduit.

FOLKE E. SANDELL.